United States Patent
Kenkel et al.

(10) Patent No.: US 10,125,475 B2
(45) Date of Patent: Nov. 13, 2018

(54) METHOD OF TESTING CYCLE TIME OF AN IMPLEMENT ON A WORK MACHINE AND SYSTEM THEREOF

(71) Applicant: Deere & Company, Moline, IL (US)

(72) Inventors: Aaron R. Kenkel, East Dubuque, IL (US); Michael R. Gratton, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 112 days.

(21) Appl. No.: 15/428,562

(22) Filed: Feb. 9, 2017

(65) Prior Publication Data

US 2018/0223502 A1    Aug. 9, 2018

(51) Int. Cl.

| | |
|---|---|
| *E02F 9/26* | (2006.01) |
| *E02F 9/20* | (2006.01) |
| *G07C 5/08* | (2006.01) |
| *G04F 10/00* | (2006.01) |
| *E02F 3/28* | (2006.01) |
| *E02F 3/96* | (2006.01) |

(52) U.S. Cl.
CPC ............ *E02F 9/26* (2013.01); *E02F 9/2004* (2013.01); *E02F 9/268* (2013.01); *G04F 10/00* (2013.01); *G07C 5/0808* (2013.01); *G07C 5/0816* (2013.01); *G07C 5/0841* (2013.01); *E02F 3/283* (2013.01); *E02F 3/961* (2013.01)

(58) Field of Classification Search
CPC . E02F 9/26; E02F 9/2004; E02F 9/268; E02F 3/283; E02F 3/961; G07C 5/0808; G07C 5/0816; G07C 5/0841; G04F 10/00
See application file for complete search history.

(56) References Cited

U.S. PATENT DOCUMENTS

| | | | |
|---|---|---|---|
| 5,955,706 A | 9/1999 | Fonkalsrud et al. | |
| 8,185,290 B2 | 5/2012 | Mintah et al. | |
| 8,775,035 B2 | 7/2014 | Sherlock et al. | |
| 9,580,883 B2 * | 2/2017 | Singh | E02F 3/434 |
| 2016/0138240 A1 | 5/2016 | Ikegami et al. | |

* cited by examiner

*Primary Examiner* — Russell Frejd
(74) *Attorney, Agent, or Firm* — Taft Stettinius & Hollister LLP; Stephen F. Rost (57) ABSTRACT

A method of determining a cycle time of an implement on a work machine includes providing a controller and an actuator for controlling the implement, sending a first instruction from the controller to move the implement to a first position, and sending a second instruction from the controller to move the implement from the first position to a second position. A distance between the first position and the second position is an approximate full stroke of the actuator. The method also includes measuring an amount of time it takes for the implement to move between a first threshold position and a second threshold position. The first threshold position and the second threshold position are defined positions between the first and second positions. The method further includes determining the cycle time of the implement based on the measuring step.

20 Claims, 5 Drawing Sheets

METHOD OF TESTING CYCLE TIME OF AN IMPLEMENT ON A WORK MACHINE AND SYSTEM THEREOF

FIELD OF THE DISCLOSURE

The present disclosure relates to a work machine, and in particular, to a method of testing the cycle time of an implement on the work machine.

BACKGROUND OF THE DISCLOSURE

Many work machines, such as a loader, include one or more implements capable of performing a work function. For example, a loader may include a boom and a bucket. During operation, the boom can raise and lower the bucket to perform a digging function. To ensure desirable operation, an operator or service technician can execute a cycle time test on the implement. To do so, the operator or technician uses a stopwatch or a clock to run the test. The cycle time test may be performed in the field or on a test stand during an assembly process.

While the use of a stopwatch or a clock located nearby is often used, it does lead to some inaccuracies between measurements. In particular, the operator may not start or stop the test at the same point between two individual tests. Moreover, two different operators may run the cycle time test differently. With timing discrepancies inherent in the manner by which the test is performed, it can be difficult to diagnose possible problems in the field or with a newly built machine on a test stand.

SUMMARY

In one embodiment, a method of determining a cycle time of an implement on a work machine includes providing a controller and an actuator for controlling the implement; sending a first instruction from the controller to move the implement to a first position; sending a second instruction from the controller to move the implement from the first position to a second position, where a distance between the first position and the second position comprises an approximate full stroke of the actuator; measuring an amount of time it takes for the implement to move between a first threshold position and a second threshold position, where the first threshold position and the second threshold position are defined positions between the first and second positions; and determining the cycle time of the implement based on the measuring step.

In one example of this embodiment, the determining step may include multiplying the measured amount of time by a factor, the factor being a function of a test distance defined between the first and second threshold positions and an overall distance defined between the first and second positions. In a second example, the method may include calculating the factor by dividing the overall distance by the test distance. In a third example, the method may include executing the sending a first instruction step, sending a second instruction step, the measuring step, and the determining step autonomously by the controller.

In a fourth example, the method may include starting a timer once the implement moves from the first position to the first threshold position; and stopping the timer once the implement moves from the first threshold position to the second threshold position. In a fifth example, the method may include displaying the cycle time on a monitor of the work machine. In a sixth example, the method may include providing a cycle time threshold; and triggering a first alert if the cycle time is less than the cycle time threshold indicative of a satisfactory cycle time, or a second alert if the cycle time is not less than the cycle time threshold. In a seventh example, the method may include receiving by the controller an instruction to execute the cycle test; running a prerequisite algorithm by the controller before the sending steps; and executing by the controller the prerequisite algorithm by detecting a hydraulic oil temperature and comparing the hydraulic oil temperature to an oil temperature threshold; determining an engine speed and comparing the engine speed to an engine speed threshold; determining if a hydraulic status is enabled; determining if a park brake is engaged; and determining if any diagnostic trouble codes are active.

In an eighth example, the method may include executing the sending a first instruction step if the hydraulic oil temperature is greater than the oil temperature threshold, the engine speed is greater than the engine speed threshold, the hydraulic status is enabled, the park brake is engaged, and no diagnostic trouble codes are active. In a ninth example, the method may include detecting by the controller if the implement is in the first position after the sending a first instruction step; triggering an error code if the implement is not in the first position; and repeating the sending a first instruction step.

In another example of the present disclosure, the method may include detecting an engine speed of the work machine and comparing the engine speed to an engine speed threshold; triggering an error code if the detected engine speed is less than the engine speed threshold; and repeating the sending a first instruction step. In a further example, the method may include providing a second implement on the work machine; detecting if the second implement is in an interfering position such that the second implement interferes with the implement when moving from the first position to the second position; triggering an error code if the second implement is disposed in the interfering position; and repeating the sending a first instruction step. In yet a further example, the method may include providing an operator control for controlling the implement; communicating to an operator of the work machine via the controller to fully command the implement from the first position to the second position; detecting a command signal from the operator control; comparing the command signal to a command threshold; triggering an error code if the command signal is less than the command threshold; and repeating the sending a first instruction step.

In another embodiment of the present disclosure, a method of determining a cycle time of a first implement on a work machine includes providing a controller, a first actuator for controlling the first implement, a second implement, a second actuator for controlling the second implement, a first sensor, and a second sensor; receiving a command via the controller to execute a cycle time test on the first implement; sending a first instruction from the controller to move the implement to a first position; sending a second instruction from the controller to move the implement from the first position to a second position, where a distance between the first position and the second position comprises an approximate full stroke of the first actuator; starting a timer once the first implement moves from the first position to a first threshold position, the first threshold position located between the first and second positions; and stopping the timer once the first implement moves from the first threshold position to a second threshold position, the second threshold position located between the first and second positions; determining the cycle time of the first implement based on the measuring step.

In one example of this embodiment, the method may include detecting when the first implement reaches the first and second threshold positions via the first sensor; and communicating to the controller by the first sensor when the first implement reaches the first and second threshold positions. In a second example, the method may include executing an algorithm after the receiving step by detecting a hydraulic oil temperature and comparing the hydraulic oil temperature to an oil temperature threshold; determining an engine speed and comparing the engine speed to an engine speed threshold; determining if a hydraulic status is enabled; determining if a park brake is engaged; and determining if any diagnostic trouble codes are active; and advancing to perform the sending a first instruction step if the hydraulic oil temperature is greater than the oil temperature threshold, the engine speed is greater than the engine speed threshold, the hydraulic status is enabled, the park brake is engaged, and no diagnostic trouble codes are active.

In another example of this embodiment, the method may include detecting by the controller if the first implement is in the first position; detecting an engine speed of the work machine and comparing the engine speed to an engine speed threshold; detecting if the second implement is in an interfering position such that the second implement interferes with the first implement when moving from the first position to the second position; triggering an error code if (a) first implement is not in the first position, (b) the engine speed is less than the engine speed threshold, or (c) the second implement is disposed in the interfering position; and repeating the sending a first instruction step if the error code is triggered.

In yet another example, the method may include providing an operator control for controlling the first implement; communicating to an operator of the work machine via the controller to fully command the first implement from the first position to the second position; detecting a command signal from the operator control; comparing the command signal to a command threshold; triggering an error code if the command signal is less than the command threshold; and repeating the sending a first instruction step if an error code is triggered.

In a further embodiment of the present disclosure, a system for determining a cycle time of an implement on a work machine includes a frame of the work machine, where the implement is coupled to the frame and is adapted to perform a machine function; a controller for controlling the work machine; an actuator for controlling movement of the implement between a first position and a second position, the actuator in communication with the controller, where the actuator fully strokes between the first position and the second position; a user control in electrical communication with the controller, the user control configured to control a stroke of the actuator to move the implement between the first position and the second position; and a sensor adapted to detect a position of the implement between the first position and the second position, the sensor disposed in electrical communication with the controller; wherein, the controller executes a cycle time process to determine the cycle time of the implement by sending a first instruction to move the implement to the first position, sending a second instruction to move the implement from the first position to a second position, starting a timer once the implement moves a first distance from the first position, stopping the timer once the implement moves a second distance from the first position, and determining the cycle time of the implement based on an amount of time that elapses when the implement moves from the first distance to the second distance.

In one example of this embodiment, the system may include an engine mounted to the frame for producing power to propel the work machine; a park brake controllable between an engaged position and a disengaged position; and a second implement coupled to the frame or the first implement, the second implement adapted to perform a second machine function; wherein, the controller is configured to execute the cycle time process as long as an engine speed of the engine exceeds an engine speed threshold, the park brake is disposed in its engaged position, the second implement is not disposed in an interfering position, and a command signal from the user control to the actuator exceeds a command signal threshold.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
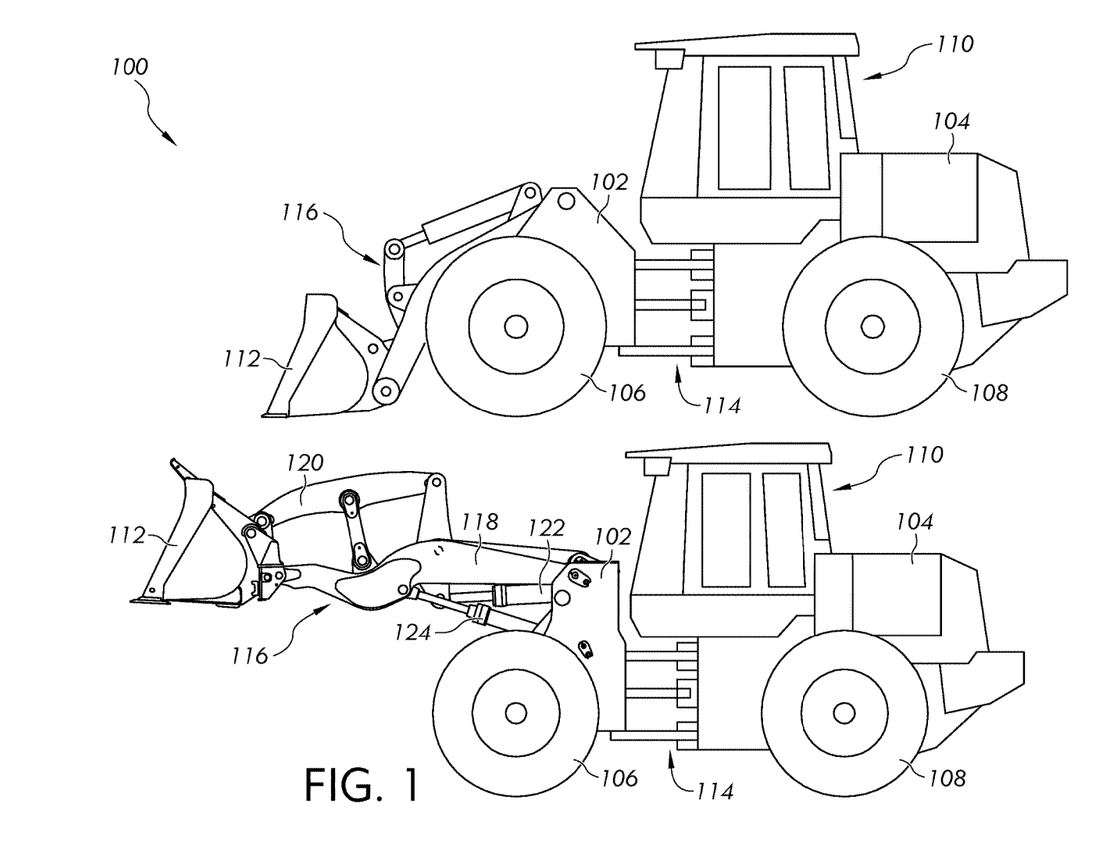
FIG. 1 is a side view of a work machine.

An example embodiment of a work machine is shown in FIG. 1. The machine is illustrated as a front loader 100 such as a four-wheel drive loader. The present disclosure is not limited, however, to a loader and may extend to other work machines such as an excavator, a backhoe loader, crawler, harvester, skidder, motor grader, or any other work machine. As such, while the figures and forthcoming description may relate to a loader, it is to be understood that the scope of the present disclosure extends beyond a loader and, where applicable, the term "machine" or "work machine" will be used instead. The term "machine" or "work machine" is intended to be broader and encompass other vehicles besides a loader for purposes of this disclosure.

Referring to FIG. 1, the machine 100 includes a front frame assembly 102 and a rear frame assembly 104 that may be pivotably coupled to one another via an articulation pivot or joint 114. The front frame assembly 102 can be supported by a front ground-engaging mechanism 106 such as a wheel or track. Likewise, the rear frame assembly 104 can be supported by a rear ground-engaging mechanism 108 such as a wheel or track. In the illustrated embodiment of FIG. 1, the front frame assembly 102 is supported by a pair of front The machine 100 of FIG. 1 may also include an operator cab 110 supported by the rear frame assembly 104 to substantially enclose and protect the operator of the machine 100. The operator cab 110 may include a plurality of controls for operating the machine 100. Although not shown in FIG. 1, a steering wheel or joystick may be used to manipulate a direction of travel of the machine 100. In addition, other controls such as joysticks, pedals, switches, buttons, and the like may be used for controlling one or more work functions of the machine 100.

The machine 100 may include at least one work tool, illustratively a first work tool 112 (i.e., a loader bucket) coupled to the front frame assembly 104. Other suitable work tools may be used such as, for example, blades, forks, tillers, and mowers. The work tool or implement 112 may be removably coupled to the front frame assembly 102 for scooping, carrying, and dumping dirt and other materials. The operator may control the work tool or implement 112 via user controls 208 within the operator cab 110.

As shown in FIG. 1, the work tool or implement 112 is moveably coupled to the front frame assembly 102 via a linkage assembly 116, which includes at least one boom 118, a linkage or coupler 120, and a plurality of hydraulic actuators for moving the work tool or implement 112 relative to the front frame assembly 102. The plurality of hydraulic actuators may include a first actuator 122 and a second actuator 124. These actuators may take the form of a hydraulic lift cylinder for raising and lowering the boom 118 and a hydraulic tilt cylinder for tilting (e.g. digging and dumping) the work tool or implement 112. As described above, the work tool or implement 112 may be removed from the linkage assembly 116 so that a different work tool or implement (e.g., a blade or forks) may be coupled thereto.

Figure 2:
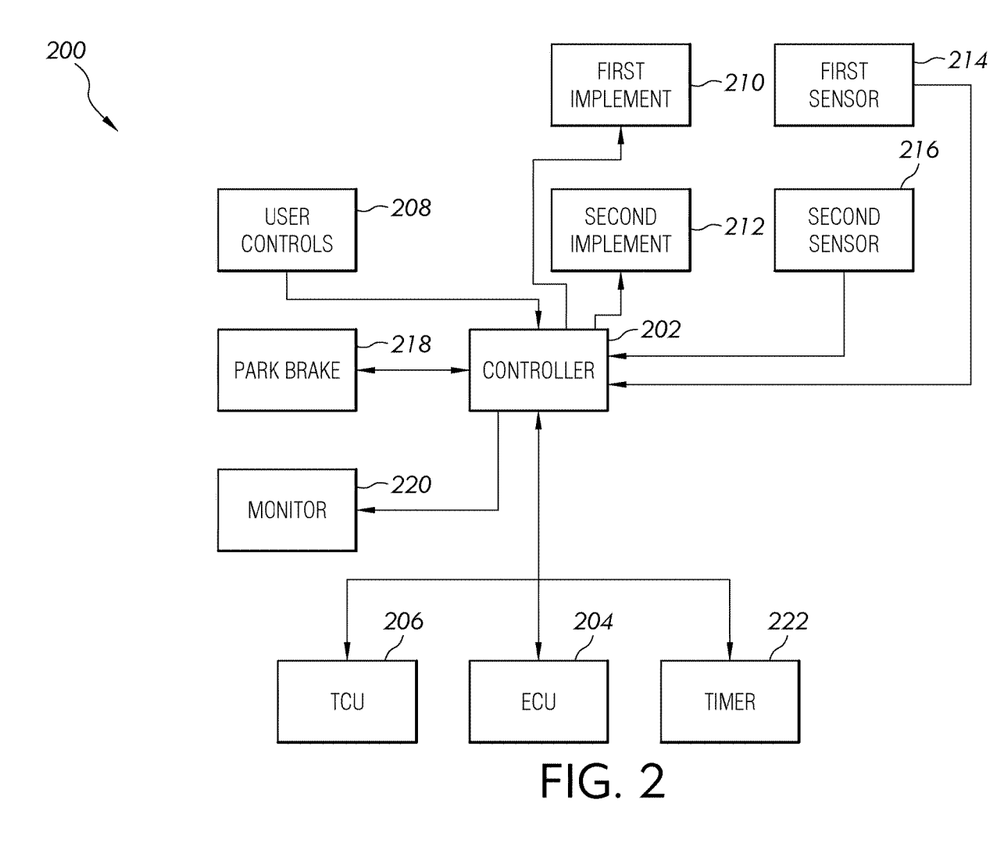
FIG. 2 is a controls schematic of the work machine.

Referring now to FIG. 2, a control system 200 of a work machine (e.g., such as the loader backhoe 100 in FIG. 1) is provided. The control system 200 may include a machine controller 202 for controlling the functionality of the machine. The controller 202 may include a plurality of inputs and outputs. For instance, the controller 202 may receive commands or instructions from a machine operator via a plurality of user controls 208. The plurality of user controls may include a first user control such as a steering wheel (e.g., steering wheel 112) or joystick used for steering or controlling a direction of travel of the work machine. A second user control may be a joystick, lever, pedal, or other known control for controlling a speed of the work machine. Moreover, a third user control may be an ignition switch for a key or a push button, for example, in which the operator triggers the engine of the machine between an on and off condition. Another user control may include a joystick, lever, knob or the like for controlling an implement. Other user controls may also be incorporated into the control system 200 of FIG. 2, including but not limited to controls for braking, engaging or disengaging a park brake, hydraulic controls, engine controls, transmission controls, etc. The present disclosure is not limited to any number or type of controls. As shown in FIG. 2, the plurality of user controls 208 may be electrically coupled to the controller 202 to allow the machine operator to send commands thereto for controlling the machine.

As described above with reference to FIG. 1, the work machine may include an engine (e.g., engine 104) or prime mover for producing power and a transmission (not shown) for transferring the power to the front and rear wheels. The engine may be controlled by an engine control unit (ECU) 204, which as shown in FIG. 2, may be in electrical communication with the controller 202. Likewise, the transmission may be controlled by a transmission control unit (TCU) 206, which may also be in electrical communication with the controller 202. The ECU 204 and TCU 206 may be electrically coupled to the controller 202 via hard wiring or a wireless connection. In one non-limiting example, the controller 202 may communicate with the ECU 204 and TCU 206 over a communication network such as a controller area network (CAN). As will be further described below, a timing mechanism such as an internal clock or timer 222 may be internally disposed within the controller 202 or otherwise in electrical communication with the controller 202.

A park brake control 218 may be manually controlled by an operator to engage or disengage a park brake of the work machine. When engaged, the park brake may slow the speed of the machine. Alternatively, the park brake control 218 may be in electrical communication with the controller 202, and the controller 202 may engage or disengage the park brake.

Although not specifically shown in FIG. 1 of this disclosure, the work machine may include a display monitor 220 located inside the cab 110 for displaying information to an operator. The monitor 220 may also include a touchscreen or other controls so that an operator may send instructions to the controller 202 for controlling a function of the work machine. As such, the monitor 220 may be in electrical communication with the controller 202 so that messages or instructions may be communicated therebetween.

Similar to the work machine 100 of FIG. 1, the control system 200 may include a first implement 210 and a second implement 212. While these are referred to as implements, it may also correspond with a first actuator 210 for controllably moving the first implement and a second actuator 212 for controllably moving the second implement. Each implement or actuator may be disposed in electrical communication with the controller 202 such that the controller controls movement of the implement or actuator. In one example, the actuator may be a hydraulic actuator such that control of the implement is electro-hydraulically driven. In another embodiment (not illustrated), each implement or actuator may be manually controlled by the user controls. Other known control systems may be used for controlling movement of the implement or actuator.

In one non-limiting example, the first implement 210 may be a boom or bucket, and the second implement may be a boom or bucket. Referring to FIG. 1, for example, the first implement 210 may correspond with the boom arm 142 and the second implement 212 may correspond with the second work tool 138. This, however, is only one example as it relates to FIG. 1, and this disclosure may cover any agricultural, construction, forestry, or other vehicle or work machine.

The control system 200 may also include a first sensor 214 for detecting movement or a position of the first implement. Likewise, a second sensor 216 may detect movement or a position of the second implement. The first and second sensors may each be a position sensor. For example, one or both sensors may be located on a linkage assembly (i.e., the linkage assembly 144 of FIG. 1). Moreover, one sensor may be an angular position sensor capable of directly detecting the angular position of the boom relative to the pin it rotates about. The other sensor may detect angular position of a bell crank on a loader (i.e., a Z-bar linkage). Kinematics and the like may be used in addition to the measurement by the sensor to detect a bucket position, for example. Alternatively, in-cylinder position sensors may be used for detecting actuator position. The actuator may be electrical, hydraulic, mechanical, or any other known type of actuator. In any event, the first sensor 214 and second sensor 216 may be disposed in electrical communication with the controller 202 to communicate the movement or position of each respective implement, and this may be used on any type of agricultural, construction, forestry, or other known work machine.

Figure 3:
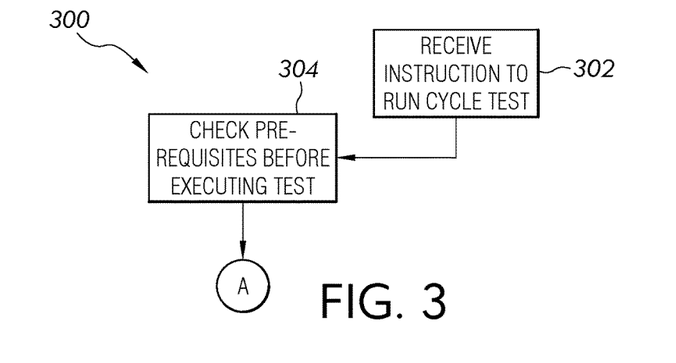
FIGS. 3-8 is a method of one embodiment of performing a cycle time test of an implement on a work machine.

Referring now to FIG. 3, a control method or process 300 is illustrated for determining a cycle time of an implement of a work machine. The control method or process 300 may include a plurality of blocks or steps that are executable by the controller and other features of the control system 200. For purposes of this disclosure, cycle time may refer to an amount of time it takes to move an implement or actuator from one end or position to an opposite end or position. A boom, for example, may be controlled from its fully lowered position to its fully raised position during a cycle time test, and the cycle time is the amount of time that elapses as the boom moves between the two aforementioned positions. A bucket may move from its fully dumped position to its fully curled position during a cycle time test. The cycle time is the amount of time that it takes for the bucket to move between these two positions.

A cycle time test may be executed in the field by a service technician or machine operator. Alternatively, the test may be executed on a final test stand, for example, to ensure the machine is working properly before it leaves a manufacturing or assembly factory. During the test, the implement or actuator may be controlled between its two end positions and the amount of time for it to do so is timed. There may be a predefined cycle time by which the test result is compared to determine if the machine is functioning properly.

A cycle time test, like the one shown in FIGS. 3-8, may be executed to identify or determine a possible problem in a hydraulic circuit of the machine. For example, a hydraulic pump may provide flow to an actuator for controlling an implement. If there is a lack of expected pump flow output from the pump, there may be problems with pump efficiency or a leak in the system. An operator or technician may detect an issue with the implement due to a slower than expected or desired response. There may be less power delivered to the implement and this may affect performance. If the cycle time of the implement is tested and the result is undesirable or unsatisfactory, there may be a need to check various pump settings such as a pump margin setting or cutoff pressure.

As described above, cycle time testing is often performed by a machine operator or technician using a stopwatch to time the implement. This, however, can introduce error into the test due to operator error or differences in running the test. One operator may trigger the stopwatch more quickly, whereas a second operator may be slower in triggering the stopwatch. If the overall cycle time is less than 10 seconds, for example, an error as great as 0.5 seconds can greatly affect the accuracy of the test.

In accordance with this disclosure, the control process 300 of FIG. 3 may be executed autonomously by the controller 202, or at least semi-autonomously by the controller. By using the controller 202, certain features that may otherwise negatively impact the cycle time test may be shutoff or controlled in such a way that a more accurate cycle time may be measured.

Referring back to FIG. 3, the control process 300 may be executed by the controller 202. In a first block 302 or step of the process 300, the controller 202 may receive an instruction or command to run a cycle test. This instruction or command may come from an operator or service technician. In one such example, the operator may send the command via the display monitor 220. The display monitor 220 may display various screens or menus which are part of a software program. In any event, one of the menu options may be a cycle test for a given implement, and the operator may select the cycle time option and choose which implement (if there are more than one implements on the machine) to run the test on. In an alternative embodiment, the controller 202 may be programmed to diagnose certain problems with the machine, and if the controller 202 detects a possible problem (e.g., with the hydraulic system) the controller 202 may be programmed to run the cycle test.

Once the controller 202 receives the instruction to run the cycle test in block 302, the controller 202 may be programmed to run a prerequisite algorithm. The controller 202 may include a memory unit for storing the algorithm and any other software for controlling the machine. The controller 202 may also include a processor for executing the algorithm and other software. To run the algorithm, the controller 202 executes block 304 which includes a plurality of conditions (see FIG. 4).

Figure 4:
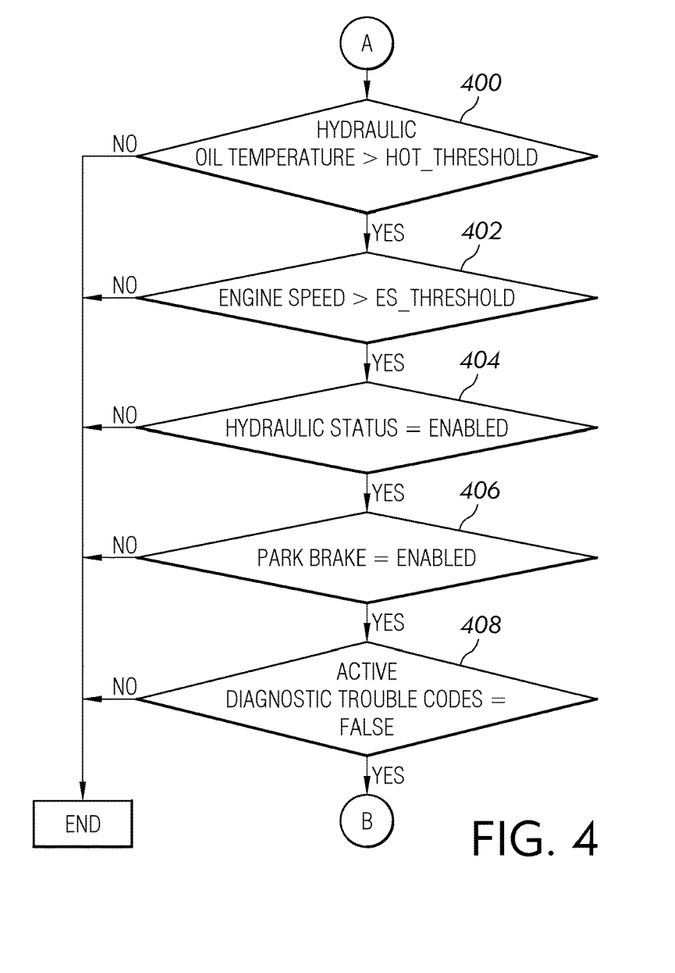

As shown in FIG. 4, the controller 202 may execute the prerequisite algorithm by evaluating several conditions and comparing the conditions to thresholds. In block 400, for example, the controller 202 may receive a hydraulic oil temperature from a temperature sensor (not shown) or the like. The temperature sensor may be disposed in electrical communication with the controller 202 for communicating the hydraulic oil temperature. In block 400, the controller 202 may also store threshold values in its memory unit. One such threshold value is a hydraulic oil temperature threshold ("HOT_Threshold"). The controller 202 may compare the current hydraulic oil temperature to the HOT_Threshold value and determine if the current temperature satisfies the threshold. The threshold value may be set to any value. In one non-limiting example, the HOT_Threshold may be predefined as 50° C. In block 400, the controller 202 determines if the current temperature exceeds the HOT_Threshold and if it does then the process advances to block 402. If, however, the current hydraulic oil temperature does not exceed the threshold, then the controller 202 may be configured to alert the operator (e.g., via the monitor 220) that the temperature does not meet the prerequisite threshold temperature in order to run the cycle test. As shown in FIG. 4, the prerequisite algorithm may terminate until the operator or technician (or controller) initiates another cycle time test.

In block 402, the controller 202 may receive an engine speed measurement from the ECU 204, for example. The engine speed may also be communicated over a CAN bus or other communication link. Moreover, the controller 202 may receive engine speed directly from a sensor (not shown) that detects engine speed. In any event, in block 402 the controller 202 can compare the engine speed to an engine speed threshold, "ES_Threshold". The ES_Threshold may be predefined to ensure enough hydraulic flow is provided to control the implement. The controller 202 therefore may compare the engine speed to the ES_Threshold and determine if the engine speed satisfies the threshold. Here, the controller 202 may determine that the engine speed exceeds the threshold, and thus execution of the prerequisite algorithm may advance to block 404. If, however, the engine speed does not satisfy the threshold, the algorithm may terminate as shown in FIG. 4.

Another condition of the requisite algorithm is a hydraulic status of the work machine. Here, the controller 202 may execute block 404 by confirming that the hydraulic status is enabled. If it is enabled, the controller 202 may advance to block 406. If the status is disabled, then the algorithm may terminate. Similarly, in block 406, the controller 202 may determine a status of the park brake. In particular, the controller 202 may determine whether the park brake is engaged or disengaged. If engaged or enabled, the controller 202 may advance to block 408. If the park brake is disengaged or disabled, or the controller 202 is unable to engage it, then the prerequisite algorithm may terminate.

Figure 5:
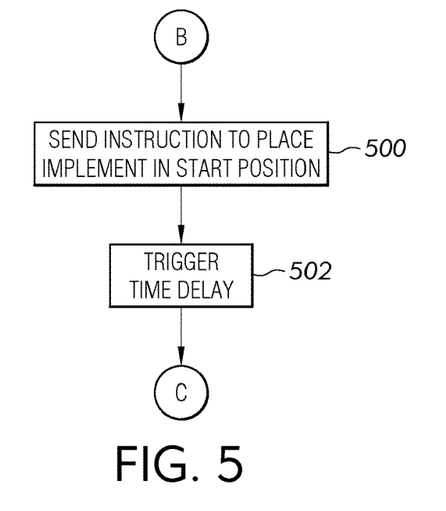

The prerequisite algorithm may further be executed by the controller 202 in order to determine if there are any active diagnostic trouble codes ("DTCs"). If there is an active DTC, then the controller 202 may terminate the algorithm. If there are no active DTCs, then the controller 202 may advance to block 500 as shown in FIG. 5.

The aforementioned prerequisite algorithm of FIG. 4 illustrates a number of conditions that the controller 202 evaluates before executing the cycle test. It is to be understood that the prerequisite algorithm may be executed to include different conditions. Thus, FIG. 4 is only one example of a prerequisite algorithm. Moreover, the controller 202 may execute the blocks in any order and that shown in FIG. 4 is only one example. The controller 202 may execute each of the blocks simultaneously as well. FIG. 4 is therefore only shown as one example of many possible examples of a prerequisite algorithm and the various conditions that may form part of the algorithm. It is not intended to limit the scope of this disclosure.

If each of the prerequisite conditions satisfies a corresponding threshold, then the controller 202 may determine that the work machine is in an operating condition such that the cycle time test may proceed. Turning to FIG. 5, the controller 202 may send an instruction in block 500 to the machine operator, technician or whichever party sent the instruction in block 302 to control the implement to its start position. The start position may correspond to a fully lowered position of the boom. It may also refer to a fully dumped position of the bucket. If the implement is controlled by an actuator, the start position may correspond with a cylinder rod being at one end of the cylinder. The controller 202 may communicate this instruction to the monitor 220 located in the cab of the machine. Once the instruction is communicated to the operator, the controller 202 may initiate a time delay in block 502 to give the operator an opportunity to control the implement to its start position. At the conclusion of the time delay, the control process may advance to block 600 of FIG. 6.

Although block 502 illustrates the controller 202 initiating a time delay, in an alternative embodiment there may not be a time delay. Instead, the overall control process may be paused or put on hold until the operator communicates to the controller 202 via a user control 208 that the implement is in its start position. In one aspect, there may be a button or icon on the display monitor 220 which the operator can press indicating that the implement is in the start position. In any event, the operator may be required to communicate to the controller 202 that the implement has been controlled to its start position before the cycle test can begin.

In another embodiment, the time delay may actually function as a "time-out" feature where the control process is cancelled or returns to block 302 after a predefined amount of time passes without the operator communicating to the controller 202 that the implement is in its start position. This "time-out" feature may be incorporated in any of the aforementioned embodiments.

In this embodiment, the controller 202 sends the instruction to a user or operator and requests the implement to controlled to its start position. In a different embodiment, particularly in a controlled environment, the controller 202 may be configured to control the implement to its start position without requiring any manual intervention. This may be an example of where the test is run in a test cell or test environment, and proximity sensors and other safety measures may be incorporated to detect any possible object that would interfere with controlled movement of the implement to its start position.

Figure 6:
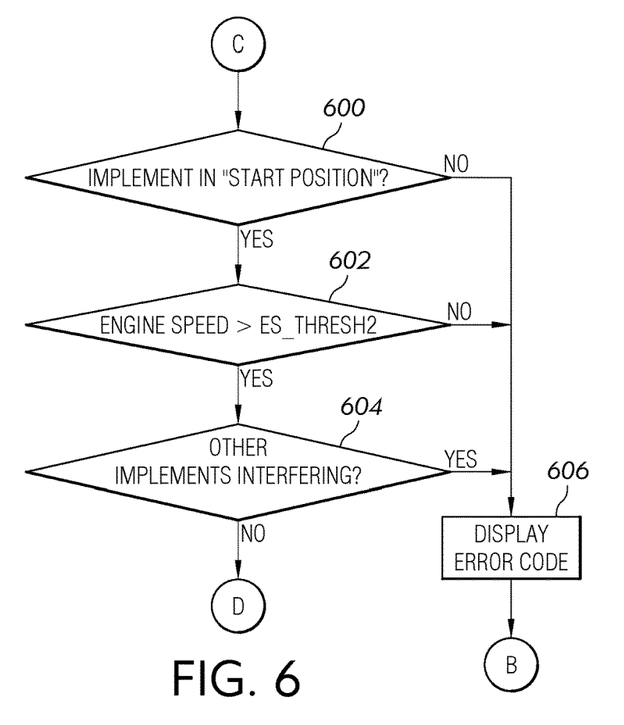

In FIG. 6, the controller 202 is configured to execute another series of conditional tests before the cycle time test is performed. In block 600, for example, the controller 202 detects the position of the implement or actuator controlling the implement and determines if the implement is in its start position. There may be a range associated with the start position such that the controller 202 determines if the implement is within a certain range of the start position (e.g., 5-10%). If the controller 202 determines in block 600 that the implement is not in its start position or within the predefined range of the start position, the controller 202 may trigger an error code in block 606. The error code may be displayed on the display monitor 220, or an audible alarm may be generated. If the error code is generated, the controller 202 may return to block 500 and resend the instruction to control the implement to its start position.

In block 602, the controller 202 may compare the engine speed to a second engine speed threshold, ES_Thresh2. The second engine speed threshold may be the same as the first engine speed threshold, ES_Threshold, but this is not required. The two threshold values may be different. In any event, the controller 202 may receive engine speed and compare it to ES_Thresh2. If the engine speed does not satisfy the threshold, the controller 202 may trigger an error code in block 606 and return to block 500 (or terminate the control process altogether). The error code may identify to the operator that engine speed is too low, and in some instances, it may instruct the operator to increase engine speed to a speed greater than the threshold.

The controller 202 may also execute block 604 to determine if a second implement is disposed in a position that would interfere with the cycle time test. In this evaluation, the first sensor 214 and second sensor 216 may communicate the position of each implement to the controller 202. The controller 202 may be programmed such that it determines based on the position of each implement whether there is possible interference. If the controller 202 determines that there may be interference, the controller 202 may trigger an error code in block 606 indicating that the second implement needs to be repositioned. In one example, a boom may be positioned too high or low thereby making it difficult to achieve a full cylinder stroke of the bucket during a cycle time test. If too high, the bucket may hit a structural stop, and if too low there may be a limit on how much the bucket can curl. Thus, the controller 202 may be in communication with a position sensor until the boom (in this example) is moved to a boom height within a predefined height range.

If there is interference and the condition set forth in block 604 is not satisfied, the error code may appear on the display monitor 220 until the operator moves the implement to a position in which it will not interfere with the cycle test. As such, the controller 202 may continuously monitor the position of the implement and remove the error code once the implement is moved to a non-interfering position.

Similar to the prerequisite algorithm of FIG. 4, the conditions identified in FIG. 6 is not intended to be an exhaustive list of conditions checked by the controller 202. Other conditions may also be checked by the controller 202 before performing the cycle test. If all conditions are satisfied in FIG. 6, the controller 202 may advance to block 700 of FIG. 7.

Figure 7:
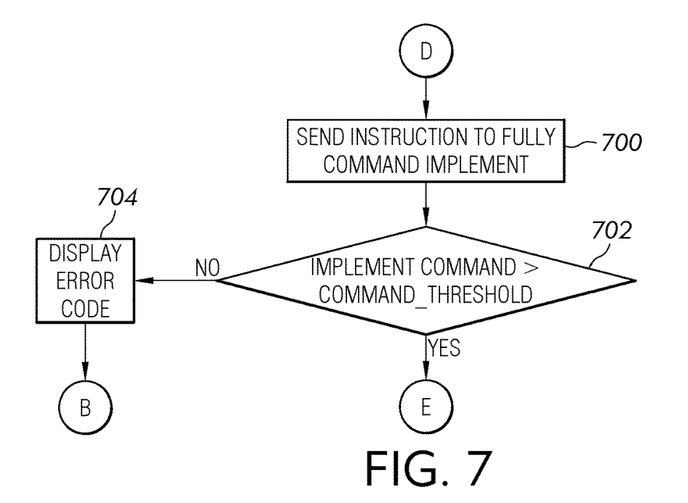

Referring to FIG. 7, the controller 202 may send an instruction in block 700 to fully command the implement from its start position to an end position. If the implement is a boom, for example, the operator or controller may fully command the boom to move from its lowered position to its fully raised position. Once the instruction is sent in block 700, the controller 202 may execute block 702 and compare the implement command to a command threshold. In this instance, the operator may actuate a user control 208 to command the implement. The actuation of the user control 208 produces a command signal to the actuator for controlling the implement. This command signal may be in the form of a percentage, e.g., 100% command. The controller 202 may receive the command signal from the user control 208 and compare the signal to the command threshold. In this example, it may be desirable for the command signal to correspond with a full command, e.g., approximately 100% command, which generates sufficient hydraulic flow to control the implement. The command threshold therefore may be set at 90-95%, for example.

In block 702, if the controller 202 determines that the implement command does not satisfy the command threshold, then the controller 202 may trigger an error code in block 704 and return to block 500. The controller 202 may display the error code on the display monitor 220 in the cab, or communicate the error code via an audible alarm, visual alarm, or any other known way. The manner in which the error code is generated in block 704 may be similar to block 606, but this is not a requirement of the control process.

Figure 8:
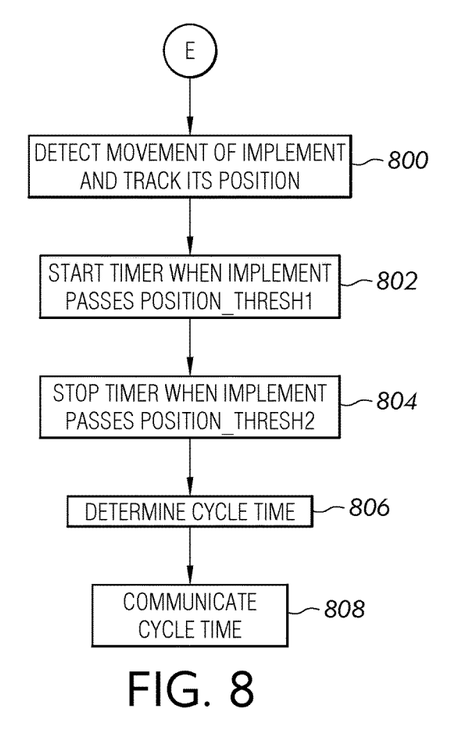

If the command signal satisfies the command threshold in block 702, then the control process may advance to block 800 in FIG. 8. In block 800, the controller 202 and position sensor may detect movement of the actuator or implement once the implement is commanded to move from its start position. In one example, if the cycle test is performed on the first implement 210, the first sensor 214 may communicate the position and movement of the first implement 210 to the controller 202. As the implement moves, the controller 202 may track its position from the start position to an end position. In this disclosure, it is noted that the start position may correspond to one end of a cylinder actuator and the end position may correspond to the opposite end thereof. The distance traveled during the cycle test between the two ends may be tracked by the controller 202.

As the implement begins moving from the start position, the controller 202 may detect when the implement reaches a first threshold position, Position_Thresh1. In one example, this first threshold position may correspond to 10-20% travel from the start position. Once the implement passes the first threshold position, the controller 202 may start a timer 222 in block 802 for measuring cycle time. The controller 202 may continuously monitor implement position via the respective position sensor, and once the implement passes a second threshold position, Position_Thresh2, the controller 202 may stop the timer 222 in block 804. The second threshold position may correspond with 80-90% travel from the start position. In this embodiment, the first threshold position is defined closer to the start position and the second threshold position is defined closer to the end position. Moreover, the threshold positions are used for measuring cycle time, rather than measuring the entire distance between the start and end positions, due to potential variability between different operators. However, in an alternative embodiment, the controller 202 may be programmed to start the timer when the implement is in its start position and the controller 202 detects an increase in command signal following block 700. Likewise, the controller 202 may stop the timer once the implement reaches the end position in this alternative embodiment.

Once the timer is stopped in block 804, the controller 202 may determine the cycle time in block 806 based on the amount of time that elapses when the implement travelled from the first threshold position to the second threshold position. The full cycle time may be determined as a function of the actual time measured and the distance travelled by the implement between blocks 802 and 804. This may be further described with respect to the following examples.

In a first example, the first threshold position may correspond with 10% travel and the second threshold position may correspond with 90% travel. Thus, the cycle time is measured over the course of 80% of the entire stroke of the actuator cylinder. Stated another way, the measured cycle time between starting and stopping the timer corresponds with the implement moving 80% of the total distance travelled between the start and end positions. If the implement is a boom, for example, the timer is started when the boom travels from its fully lowered position to a position 10% of the way to the fully raised position, and the timer is stopped when the boom travels from its fully lowered position to a position 90% of the way to the fully raised position. In this example, the full cycle time may be calculated by dividing the measured cycle time by the percentage of distance measured. So, if the measured cycle time is 5 seconds and the measured distance is 80%, the full cycle time is 5 seconds divided by 0.8 resulting in a full cycle time of 6.25 seconds.

In a second example, the first threshold position may correspond with 20% travel and the second threshold position may correspond with 80% travel. Thus, the cycle time is measured over the course of 60% of the entire stroke of the actuator cylinder (e.g., 80% minus 20%). Stated another way, the measured cycle time between starting and stopping the timer corresponds with the implement moving 60% of the total distance travelled between the start and end positions. If the implement is a boom, for example, the timer is started when the boom travels from its fully lowered position to a position 20% of the way to the fully raised position, and the timer is stopped when the boom travels from its fully lowered position to a position 80% of the way to the fully raised position. Similar to the first example, the full cycle time may be calculated by dividing the measured cycle time by the percentage of distance measured. So, if the measured cycle time is 5 seconds and the measured distance is 60%, the full cycle time is 5 seconds divided by 0.6 resulting in a full cycle time of 8.33 seconds.

Once the full cycle time is determined in block 806, the controller 202 may communicate the full cycle time in block 808. In one example, the controller 202 may communicate the cycle time to the operator by displaying it on the display monitor 220. In another example, the controller 202 may send the cycle time to a remote location (e.g., a mobile device) via a wireless communication network (e.g., Wi-Fi) so that the cycle time may be logged and tracked. In an alternative embodiment, the controller 202 may compare the cycle time to a cycle time threshold and send an alert based on the comparison. For example, if the cycle time satisfies the threshold, the controller 202 may determine that the implement and hydraulic system are functioning property and a signal may be sent indicative of this. The signal may be a visual signal or audible signal indicating that the cycle time is satisfactory. Alternatively, if the cycle time does not satisfy the threshold, the controller 202 may communicate a different signal indicative of a possible problem with the implement or hydraulic system. This different signal may be a visual or audible signal that indicates to the operator that the cycle time is unsatisfactory.

The controller 202 may also track cycle time results over a course of time and communicate the results in any desirable form. In one example, the controller 202 may communicate to an operator how the cycle time on the same implement has changed over time. This may be communicated in the form of a spreadsheet, graph, chart, or other known way. The controller 202 may save cycle time results in its memory unit, for example. The cycle time results may be used on a final test stand, for example, to monitor possible quality issues during manufacturing or assembly issues during assembly of the work machine. If there is an issue with a pump or valve (e.g., a cut seal), the controller 202 may detect this via the cycle time result. Other considerations may be implements using the principles and teachings of the present disclosure.

As described above, the cycle time test may be executed entirely by the controller 202 without any manual intervention by a machine or test stand operator. Alternatively, the operator may press a button or icon on the monitor 220 to request a cycle time test. The autonomous nature of the controller 202 executing the cycle time test can range from complete autonomy to requiring manual support to run the test.

In one such example, the cycle time test may be a semi-manually executed test. Here, the operator may turn off various features on the machine before running the test. The operator may even use a stopwatch to trigger start and stop times. The controller 202 may also execute blocks 802 and 804 so that the operator can compare cycle time measurements. If the process uses some manual intervention, the controller 202 may display instructions on the monitor or otherwise communicate instructions to the operator for executing the cycle time test. With an electro-hydraulic loader, for example, the operator may shut off or be commanded by the controller 202 to shut off certain features that might interfere with the cycle time test. In this aspect, the test may not be executed until these certain features are shut off and the controller 202 confirms as much.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of determining a cycle time of an implement on a work machine, comprising:
   providing a controller and an actuator for controlling the implement;
   sending a first instruction from the controller to move the implement to a first position;
   sending a second instruction from the controller to move the implement from the first position to a second position, where a distance between the first position and the second position comprises an approximate full stroke of the actuator;
   measuring an amount of time it takes for the implement to move between a first threshold position and a second threshold position, where the first threshold position and the second threshold position are defined positions between the first and second positions; and
   determining the cycle time of the implement based on the measuring step.

2. The method of claim 1, wherein the determining step comprises multiplying the measured amount of time by a factor, the factor being a function of a test distance defined between the first and second threshold positions and an overall distance defined between the first and second positions.

3. The method of claim 2, further comprising calculating the factor by dividing the overall distance by the test distance.

4. The method of claim 1, further comprising executing the sending a first instruction step, sending a second instruction step, the measuring step, and the determining step autonomously by the controller.

5. The method of claim 1, further comprising:
   starting a timer once the implement moves from the first position to the first threshold position; and
   stopping the timer once the implement moves from the first threshold position to the second threshold position.

6. The method of claim 1, further comprising displaying the cycle time on a monitor of the work machine.

7. The method of claim 1, further comprising:
   providing a cycle time threshold; and
   triggering a first alert if the cycle time is less than the cycle time threshold indicative of a satisfactory cycle time, or a second alert if the cycle time is not less than the cycle time threshold.

8. The method of claim 1, further comprising:
   receiving by the controller an instruction to execute the cycle test;
   running a prerequisite algorithm by the controller before the sending steps; and
   executing by the controller the prerequisite algorithm by:
      detecting a hydraulic oil temperature and comparing the hydraulic oil temperature to an oil temperature threshold;
      determining an engine speed and comparing the engine speed to an engine speed threshold;
      determining if a hydraulic status is enabled;
      determining if a park brake is engaged; and
      determining if any diagnostic trouble codes are active.

9. The method of claim 8, further comprising executing the sending a first instruction step if the hydraulic oil temperature is greater than the oil temperature threshold, the engine speed is greater than the engine speed threshold, the hydraulic status is enabled, the park brake is engaged, and no diagnostic trouble codes are active.

10. The method of claim 1, further comprising:
    detecting by the controller if the implement is in the first position after the sending a first instruction step;
    triggering an error code if the implement is not in the first position; and
    repeating the sending a first instruction step.

11. The method of claim 1, further comprising:
    detecting an engine speed of the work machine and comparing the engine speed to an engine speed threshold;
    triggering an error code if the detected engine speed is less than the engine speed threshold; and
    repeating the sending a first instruction step.

12. The method of claim 1, further comprising:
    providing a second implement on the work machine;
    detecting if the second implement is in an interfering position such that the second implement interferes with the implement when moving from the first position to the second position;

triggering an error code if the second implement is disposed in the interfering position; and
repeating the sending a first instruction step.

13. The method of claim 1, further comprising:
providing an operator control for controlling the implement;
communicating to an operator of the work machine via the controller to fully command the implement from the first position to the second position;
detecting a command signal from the operator control;
comparing the command signal to a command threshold;
triggering an error code if the command signal is less than the command threshold; and
repeating the sending a first instruction step.

14. A method of determining a cycle time of one of a plurality of implements on a work machine, comprising:
providing a controller, a first implement of the plurality of implements, a first actuator for controlling the first implement, a second implement of the plurality of implements, a second actuator for controlling the second implement, a plurality of sensors including a first sensor and a second sensor;
receiving a command via the controller to execute a cycle time test on the first implement;
sending a first instruction from the controller to move the first implement to a first position;
sending a second instruction from the controller to move the first implement from the first position to a second position, where a distance between the first position and the second position comprises an approximate full stroke of the first actuator;
starting a timer once the first implement moves from the first position to a first threshold position, the first threshold position located between the first and second positions;
stopping the timer once the first implement moves from the first threshold position to a second threshold position, the second threshold position located between the first and second positions; and
determining the cycle time of the first implement based on the measuring step.

15. The method of claim 14, further comprising:
detecting when the first implement reaches the first and second threshold positions via the first sensor; and
communicating to the controller by the first sensor when the first implement reaches the first and second threshold positions.

16. The method of claim 14, further comprising:
executing an algorithm after the receiving step by:
detecting a hydraulic oil temperature and comparing the hydraulic oil temperature to an oil temperature threshold;
determining an engine speed and comparing the engine speed to an engine speed threshold;
determining if a hydraulic status is enabled;
determining if a park brake is engaged; and
determining if any diagnostic trouble codes are active; and
advancing to perform the sending a first instruction step if the hydraulic oil temperature is greater than the oil temperature threshold, the engine speed is greater than the engine speed threshold, the hydraulic status is enabled, the park brake is engaged, and no diagnostic trouble codes are active.

17. The method of claim 14, further comprising:
detecting by the controller if the first implement is in the first position;
detecting an engine speed of the work machine and comparing the engine speed to an engine speed threshold;
detecting if the second implement is in an interfering position such that the second implement interferes with the first implement when moving from the first position to the second position;
triggering an error code if (a) the first implement is not in the first position, (b) the engine speed is less than the engine speed threshold, or (c) the second implement is disposed in the interfering position; and
repeating the sending a first instruction step if the error code is triggered.

18. The method of claim 14, further comprising:
providing an operator control for controlling the first implement;
communicating to an operator of the work machine via the controller to fully command the first implement from the first position to the second position;
detecting a command signal from the operator control;
comparing the command signal to a command threshold;
triggering an error code if the command signal is less than the command threshold; and
repeating the sending a first instruction step if an error code is triggered.

19. A system for determining a cycle time of an implement on a work machine, comprising:
a frame of the work machine, where the implement is coupled to the frame and is configured to perform a machine function;
a controller for controlling the work machine;
an actuator for controlling movement of the implement between a first position and a second position, the actuator in communication with the controller, where the actuator fully strokes between the first position and the second position;
a user control in electrical communication with the controller, the user control configured to control a stroke of the actuator to move the implement between the first position and the second position; and
a sensor configured to detect a position of the implement between the first position and the second position, the sensor disposed in electrical communication with the controller;
wherein, the controller executes a cycle time process to determine the cycle time of the implement by sending a first instruction to move the implement to the first position, sending a second instruction to move the implement from the first position to a second position, starting a timer once the implement moves a first distance from the first position, stopping the timer once the implement moves a second distance from the first position, and determining the cycle time of the implement based on an amount of time that elapses when the implement moves from the first distance to the second distance.

20. The system of claim 19, further comprising:
an engine mounted to the frame for producing power to propel the work machine;
a park brake controllable between an engaged position and a disengaged position; and
a second implement coupled to the frame or the first implement, the second implement configured to perform a second machine function;
wherein, the controller is configured to execute the cycle time process as long as an engine speed of the engine exceeds an engine speed threshold, the park brake is disposed in its engaged position, the second implement is not disposed in an interfering position, and a command signal from the user control to the actuator exceeds a command signal threshold.

* * * * *